United States Patent
Mok et al.

(10) Patent No.: US 7,948,720 B2
(45) Date of Patent: May 24, 2011

(54) VOLTAGE REGULATOR WITH TRANSIENT RECOVERY CIRCUIT

(75) Inventors: Ken Tsz Kin Mok, San Diego, CA (US);
Jackson King, Kennesaw, GA (US);
Marko Harry Koski, Scottsdale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 12/051,786

(22) Filed: Mar. 19, 2008

(65) Prior Publication Data
US 2009/0237854 A1  Sep. 24, 2009

(51) Int. Cl.
*H02H 7/00* (2006.01)
*H02H 9/00* (2006.01)
*G05F 1/00* (2006.01)

(52) U.S. Cl. ........................ 361/18; 323/272; 323/282

(58) Field of Classification Search .................. 361/18; 323/272, 282
See application file for complete search history.

(56) References Cited

U.S. PATENT DOCUMENTS

| | | | | |
|---|---|---|---|---|
| 5,889,392 | A * | 3/1999 | Moore et al. ................. | 323/282 |
| 6,605,931 | B2 * | 8/2003 | Brooks ......................... | 323/272 |
| 6,903,535 | B2 | 6/2005 | Liu et al. | |
| 7,545,054 | B2 | 6/2009 | Ozawa et al. | |
| 2003/0193364 | A1 | 10/2003 | Liu et al. | |
| 2007/0194766 | A1 | 8/2007 | Ozawa et al. | |
| 2008/0231115 | A1 * | 9/2008 | Cho et al. .................... | 307/41 |

OTHER PUBLICATIONS

International Search Report and the Written Opinion—PCT/US2009/037725, International Search Authority—European Patent Office—Aug. 13, 2009.

* cited by examiner

*Primary Examiner* — Dharti H Patel
(74) *Attorney, Agent, or Firm* — Jiayu Xu (57) ABSTRACT

A power controller having good transient performance and including a voltage regulator and one or more (K) transient recovery circuits is described. The voltage regulator receives a supply voltage and generates a regulator output signal used to generate K output voltages for K loads. Each transient recovery circuit detects for transients in a respective output voltage and corrects the detected transients. In one design, the transient recovery circuit compares the output voltage against a low threshold voltage, detects a low transient when the output voltage is below the low threshold voltage, and couples the output voltage to a high voltage to correct the low transient. Alternatively or additionally, the transient recovery circuit compares the output voltage against a high threshold voltage, detects a high transient when the output voltage is above the high threshold voltage, and couples the output voltage to a low voltage to correct the high transient.

34 Claims, 10 Drawing Sheets

VOLTAGE REGULATOR WITH TRANSIENT RECOVERY CIRCUIT

BACKGROUND

I. Field

The present disclosure relates generally to electronics, and more specifically to techniques for supplying power in an electronics device.

II. Background

An electronics device (e.g., a cellular phone) may have a voltage regulator that receives a power supply voltage and generates an output voltage for a load. The voltage regulator may be coupled to reactive components, such as an inductor and a capacitor, which can smooth out ripples in the output voltage. The reactive components may further act as energy storage elements that can supply the current drawn by the load. It may be desirable to keep the sizes of the reactive components as small as possible in order to reduce cost and area. However, reactive components of smaller sizes may not be able to adequately provide the current drawn by the load. For example, sudden changes in the load may cause transients in the output voltage, which may not be correctable by the reactive components and may degrade performance.

SUMMARY

A power controller capable of generating an output voltage with good transient performance is described herein. In one design, the power controller includes a voltage regulator and a transient recovery circuit. The voltage regulator receives a supply voltage and generates a regulator output signal used to generate an output voltage for a load. The transient recovery circuit detects for transients in the output voltage and corrects the detected transients.

In one design, the transient recovery circuit compares the output voltage against a low threshold voltage and detects a low transient when the output voltage is below the low threshold voltage. The transient recovery circuit then corrects the low transient by coupling the output voltage to a high voltage, e.g., the supply voltage. To achieve hysteresis, the transient recovery circuit may be turned on until the output voltage is above a low hysteretic voltage that is higher than the low threshold voltage. The difference between the low threshold voltage and the low hysteretic voltage is the amount of hysteresis. Alternatively or additionally, the transient recovery circuit compares the output voltage against a high threshold voltage and detects a high transient when the output voltage is above the high threshold voltage. The transient recovery circuit then corrects the high transient by coupling the output voltage to a low voltage, e.g., circuit ground. To achieve hysteresis, the transient recovery circuit may be turned on until the output voltage is below a high hysteretic voltage that is lower than the high threshold voltage.

The transient recovery circuit may include a comparator and a transistor to detect and correct low transients. The comparator receives the low threshold voltage and the output voltage and generates a control signal. The transistor is coupled between the high voltage and the output voltage and is enabled based on the control signal. The transistor may have its current limited to within a predetermined range. Alternatively or additionally, the transient recovery circuit may include a comparator and a transistor to detect and correct high transients.

In another design, a power controller includes a voltage regulator and multiple transient recovery circuits for multiple output loads. The voltage regulator receives a supply voltage and generates a regulator output signal used to generate multiple output voltages for the multiple loads. Each transient recovery circuit detects for transients in an output voltage for a respective load and corrects the detected transients in that output voltage. The voltage regulator may be a switching regulator. An inductor and a first switch may be coupled in parallel and between the voltage regulator and a common node. Multiple switches may be coupled between the common node and the multiple loads. The multiple switches may couple the inductor to the multiple loads in multiple clock periods, one load in each clock period. The first switch may be shorted for a portion of each clock cycle in order to avoid cross-regulation between the multiple loads.

Various aspects and features of the disclosure are described in further detail below.

DETAILED DESCRIPTION

The transient recovery techniques described herein may be used in combination with various types of voltage regulator such as a switching voltage regulator, a linear voltage regulator, etc. A switching voltage regulator, which is also referred to as a switch-mode power supply (SMPS) voltage regulator, rapidly switches on and off a supply voltage to generate an output voltage. Switching voltage regulators may be used when higher efficiency and/or smaller size are desired. A linear voltage regulator varies the operation of a pass transistor, which is operated in linear region instead of as a switch, to generate an output voltage. The pass transistor acts like a variable resistor to continuously adjust a voltage divider network to maintain the desired output voltage. The efficiency of a linear voltage regulator may be worse than that of a switching voltage regulator.

A switching voltage regulator may be a step-down switching regulator or a step-up switching regulator. A step-down switching regulator, which is commonly referred to as a buck converter, generates an output voltage that is lower than a supply voltage. A step-up switching regulator, which is commonly referred to as a buck-boost converter, generates an output voltage that is higher than a supply voltage.

Figure 1:
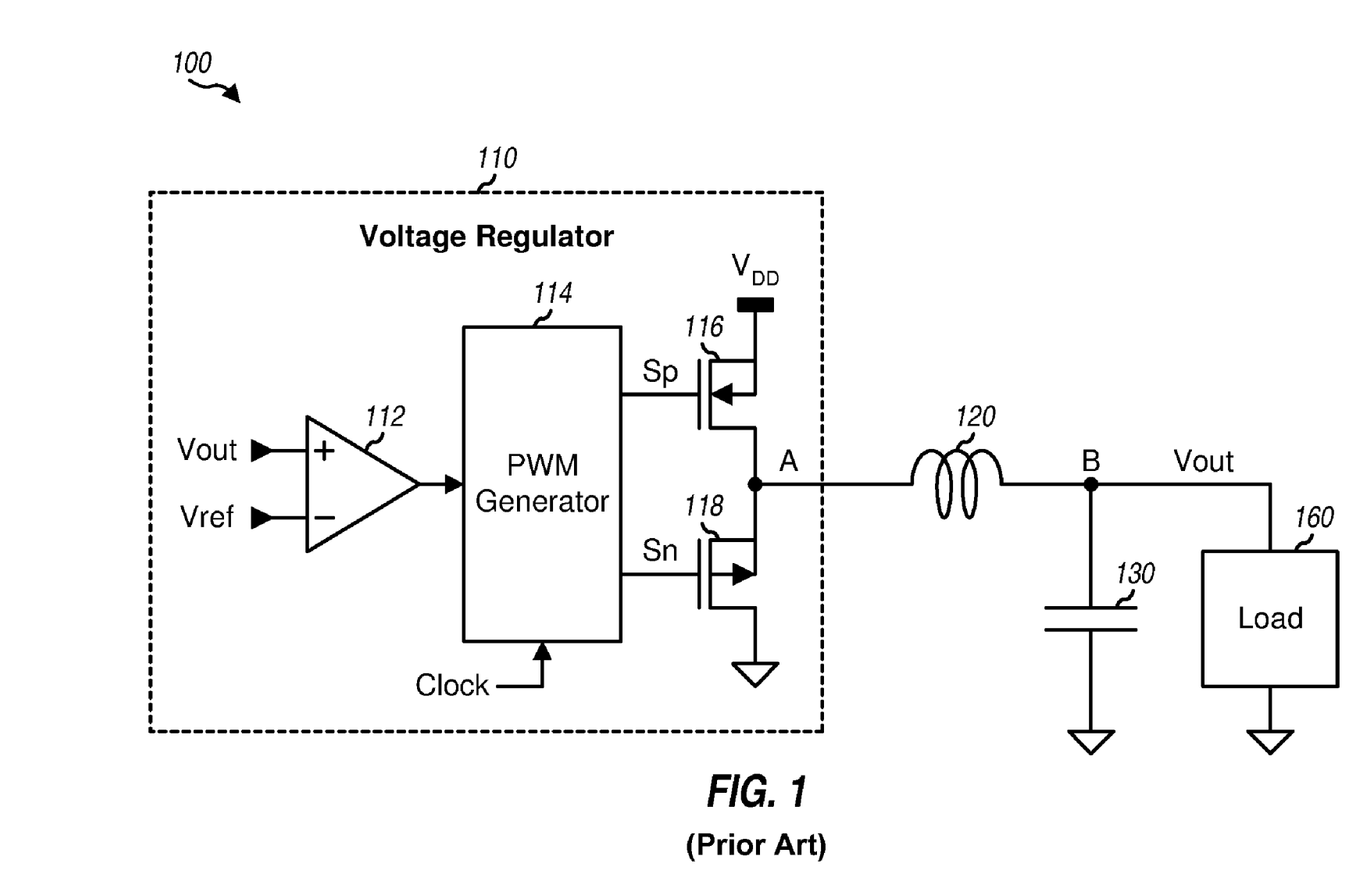
FIG. 1 shows a voltage regulator without any transient recovery circuits.

FIG. 1 shows a schematic diagram of a power controller 100 comprising a voltage regulator 110 that implements a buck converter. Voltage regulator 110 receives a supply voltage, $V_{DD}$, and generates a regulator output signal used to generate an output voltage, Vout, for a load 160.

Within voltage regulator 110, an error amplifier 112 receives the Vout voltage at a non-inverting input and a reference voltage, Vref, at an inverting input. Vref is a target voltage for Vout and may be a fixed value or a configurable value. Amplifier 112 compares the two voltages to obtain an error, amplifies the error, and provides an amplified error signal.

A pulse width modulator (PWM) generator 114 receives the amplified error signal from amplifier 112 and a clock signal and generates Sp and Sn control signals, which have variable duty cycle determined based on the amplified error signal. A P-channel metal oxide semiconductor field effect transistor (MOSFET) 116 has its source coupled to the $V_{DD}$ supply voltage, its gate receiving the Sp signal, and its drain coupled to node A, which is the output of voltage regulator 110. An N-channel MOSFET 118 has its drain coupled to node A, its gate receiving the Sn signal, and its source coupled to circuit ground. MOSFET 116 is turned on when the Sp signal is at logic low, and MOSFET 118 is turned on when the Sn signal is at logic high. The Sp and Sn signals may be generated such that at most one MOSFET is turned on at any given moment. MOSFETs 116 and 118 provide the regulator output signal at node A. This regulator output signal is a square wave signal that swings from $V_{DD}$ to circuit ground and has a duty cycle determined by Vout.

Power controller 100 further includes an inductor 120 and a capacitor 130. Inductor 120 has one end coupled to node A and the other end coupled to node B. Capacitor 130 has one end coupled to node B and the other end coupled to circuit ground. Inductor 120 and capacitor 130 filter the regulator output signal at node A to generate the Vout voltage at node B. Inductor 120 and capacitor 130 may be of suitable values to provide the desired amount of filtering for Vout.

Voltage regulator 110 may be fabricated on an integrated circuit (IC). Inductor 120 and capacitor 130 may be external to the IC. Inductor 120 and capacitor 130 may also be considered as part of voltage regulator 110.

Voltage regulator 110 operates as follows. During an On state, MOSFET 116 is turned on by the Sp signal, and MOSFET 118 is turned off by the Sn signal. The $V_{DD}$ supply voltage is coupled via MOSFET 116 to inductor 120, which stores energy from the $V_{DD}$ supply voltage. The current through inductor 120 rises during the On state, with the rate of the rise being dependent on the difference between $V_{DD}$ and Vout and the inductance L of inductor 120. During an Off state, MOSFET 116 is turned off by the Sp signal, and the $V_{DD}$ supply voltage is disconnected from inductor 120. MOSFET 118 is turned on by the Sn signal, and inductor 120 is coupled between circuit ground and node B. The current through inductor 120 falls during the Off state, with the rate of the fall being dependent on Vout and the inductance L. The $V_{DD}$ supply voltage thus provides current to capacitor 130 and load 160 during the On state, and inductor 120 provides its stored energy to capacitor 130 and load 160 during the Off state. Capacitor 130 maintains the Vout voltage at node B and also provides its charge to load 160 during the Off state.

For an ideal buck converter, the Vout voltage from the buck converter may be expressed as:

$$Vout = D \cdot V_{DD}, \qquad \text{Eq (1)}$$

where D is the duty cycle of the Sp and Sn signals. The duty cycle is the percentage of time that the buck converter is in the On state.

As shown in equation (1), the Vout voltage may be varied by adjusting the duty cycle of the Sp and Sn signals for MOSFETs 116 and 118. When Vout is below Vref, MOSFET 116 may be turned on longer to bring up Vout. Conversely, when Vout is above Vref, MOSFET 116 may be turned on shorter to bring down Vout.

Inductor 120 and capacitor 130 provide filtering for the regulator output signal at node A. In general, a larger inductor 120 and/or a larger capacitor 130 may provide more filtering, which may reduce the magnitude of ripples on the Vout voltage at node B. The sizes of inductor 120 and capacitor 130 may be selected based on a tradeoff between the amount of ripple, cost, and area.

The Vout voltage may have transients, which may be introduced by sudden changes in load 160. For example, load 160 may suddenly draw more current (e.g., due to another circuit within load 160 being turned on), and capacitor 130 may initially attempt to provide the additional current. However, as more charges are drawn from capacitor 130, the voltage across capacitor 130 and hence the Vout voltage drops. Inductor 120 may attempt to replenish the charges on capacitor 130. However, inductor 120 and capacitor 130 may be designed to provide filtering of the Vout voltage and may thus not be able to quickly respond to transients due to sudden load changes. The transients in the Vout voltage may degrade performance.

Figure 2A:
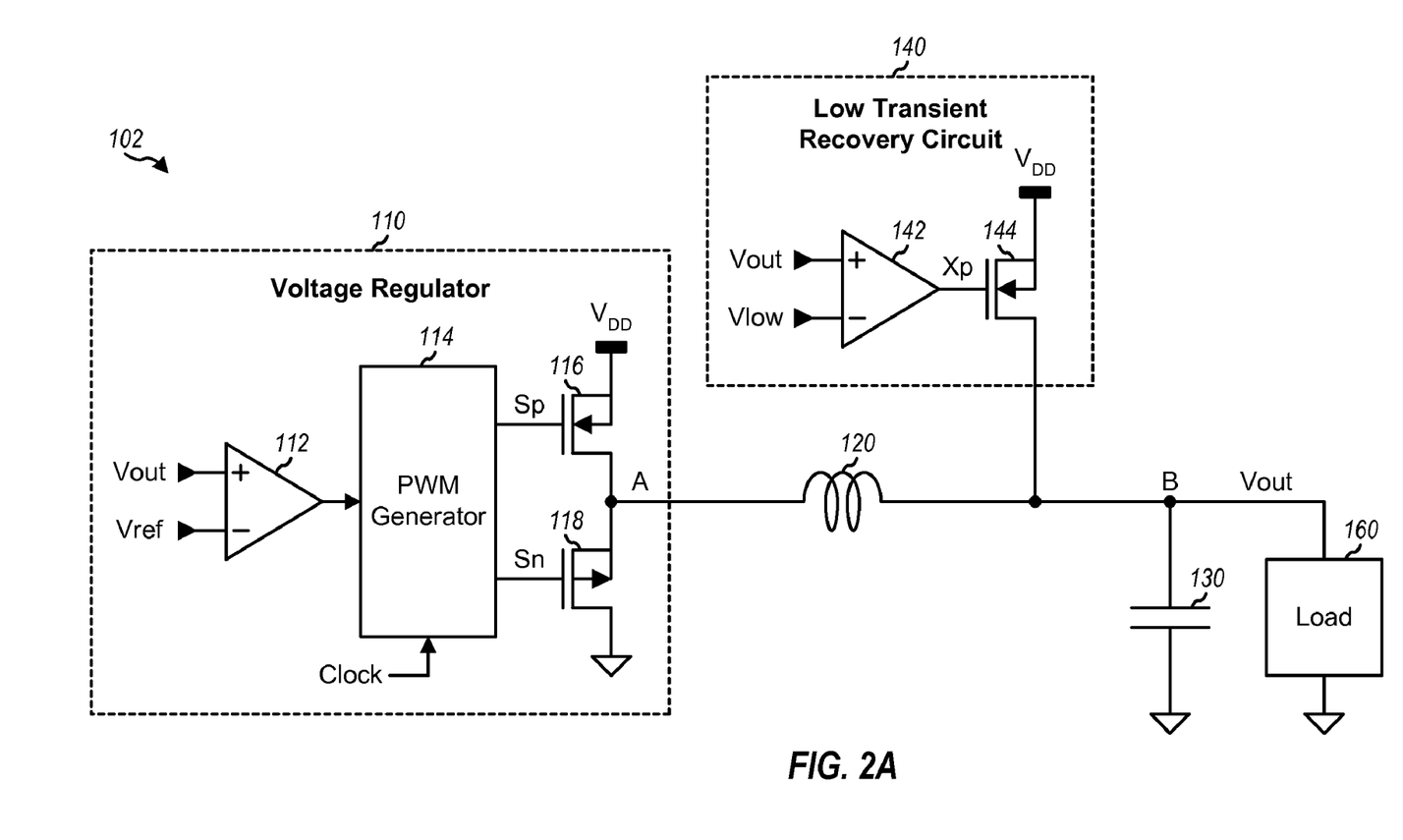
FIG. 2A shows the voltage regulator with a low transient recovery circuit.

FIG. 2A shows a schematic diagram of a power controller 102 comprising voltage regulator 110 and a low transient recovery circuit 140. Within circuit 140, a comparator 142 receives the Vout voltage at a non-inverting input and a Vlow voltage at an inverting input. Vlow is a low threshold voltage at which circuit 140 is activated and may be set to a value lower than Vref. Comparator 142 compares the two voltages and generates an Xp control signal based on the comparison result. A P-channel MOSFET 144 has its source coupled to the $V_{DD}$ supply voltage, its gate receiving the Xp signal, and its drain coupled to node B.

Circuit 140 pulls the Vout voltage at node B higher when a low transient is detected on the Vout voltage. When Vout is below Vlow (e.g., due to a sudden increase in load 160), the Xp signal is at logic low, MOSFET 144 is turned on, and the $V_{DD}$ supply voltage is coupled via MOSFET 144 to node B. The Vout voltage is thus brought up quickly by the $V_{DD}$ supply voltage. MOSFET 144 may be turned on for a brief period of time in order to bring Vout above Vlow. When Vout is above Vlow, which may be the case most of the time, the Xp signal is at logic high, MOSFET 144 is turned off, and the $V_{DD}$ supply voltage is not coupled to node B. Vlow determines the voltage at which circuit 140 is turned on in order to bring up Vout. In one design, Vlow may be a fixed value, which may be a predetermined percentage of Vref, e.g., Vlow=0.99×Vref. In another design, Vlow may be a configurable value, which may be set based on any factor.

In another design that is not shown in FIG. 2A, hysteresis is used for circuit 140. In this design, MOSFET 144 may be turned on when Vout is below Vlow and may be turned off when Vout is above Vlow_hys, where in general Vlow<Vlow_hys≦Vref. Vlow_hys is a low hysteretic voltage, which is a threshold voltage at which MOSFET 144 is turned off after it has been turned on. This design avoids MOSFET 144 being continually turned on and off when Vout is near Vlow. The difference between Vlow and Vlow_hys is the amount of hysteresis. Another comparator may be used to compare Vout against Vlow_hys and generate another control signal. The control signals from this comparator and comparator 142 may be used to generate the Xp signal for MOSFET 144. If Vlow_hys=Vref, then the signals from amplifier 112 and comparator 142 may be used to generate the Xp signal.

Figure 2B:
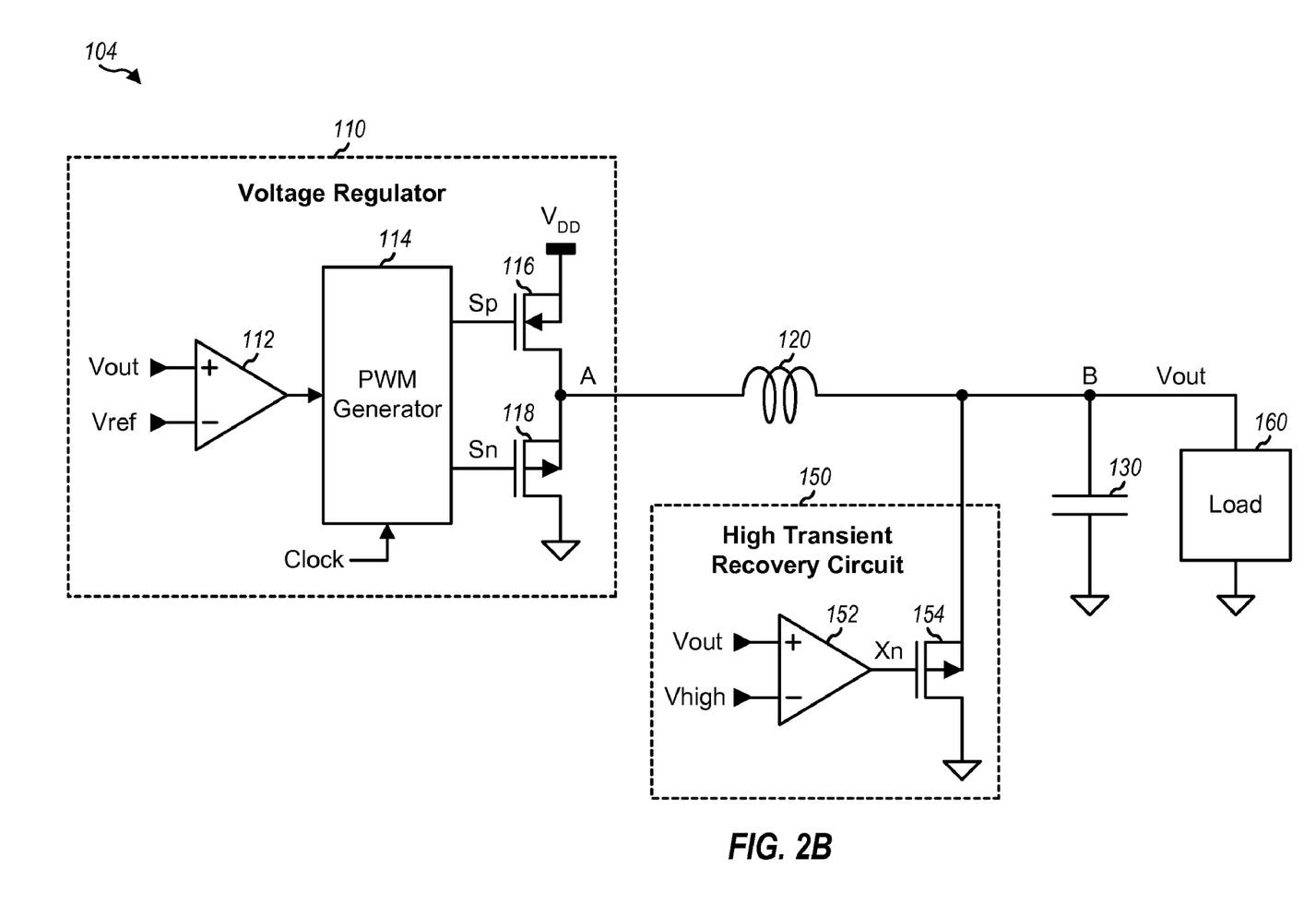
FIG. 2B shows the voltage regulator with a high transient recovery circuit.

FIG. 2B shows a schematic diagram of a power controller 104 comprising voltage regulator 110 and a high transient recovery circuit 150. Within circuit 150, a comparator 152 receives the Vout voltage at a non-inverting input and a Vhigh voltage at an inverting input. Vhigh is a high threshold voltage at which circuit 150 is activated and may be set to a value higher than Vref. Comparator 152 compares the two voltages and generates an Xn control signal based on the comparison result. An N-channel MOSFET 154 has its drain coupled to node B, its gate receiving the Xn signal, and its source coupled to circuit ground.

Circuit 150 pulls the Vout voltage at node B lower when a high transient is detected on the Vout voltage. When Vout is above Vhigh (e.g., due to a sudden decrease in load 160), the Xn signal is at logic high, MOSFET 154 is turned on, and node B is coupled via MOSFET 154 to circuit ground. The Vout voltage is thus brought down quickly by the connection to circuit ground. MOSFET 154 may be turned on for a brief period of time in order to bring Vout below Vhigh. When Vout is below Vhigh, which may be the case most of the time, the Xn signal is at logic low, MOSFET 154 is turned off, and node B is not coupled to circuit ground. Vhigh determines the voltage at which circuit 150 is turned on in order to bring down Vout. In one design, Vhigh may be a fixed value, which may be a predetermined percentage of Vref, e.g., Vhigh=1.01×Vref. In another design, Vhigh may be a configurable value, which may be set based on any factor.

In another design that is not shown in FIG. 2B, hysteresis is used for circuit 150. In this design, MOSFET 154 may be turned on when Vout is above Vhigh and may be turned off when Vout is below Vhigh_hys, where in general Vhigh>Vhigh_hys≧Vref. Vhigh_hys is a high hysteretic voltage, which is a threshold voltage at which MOSFET 154 is turned off after it has been turned on. This design avoids MOSFET 154 being continually turned on and off when Vout is near Vhigh. The difference between Vhigh and Vhigh_hys is the amount of hysteresis. Another comparator may be used to compare Vout against Vhigh_hys and generate another control signal. The control signals from this comparator and comparator 152 may be used to generate the Xn signal for MOSFET 154. If Vhigh_hys=Vref, then the signals from amplifier 112 and comparator 152 may be used to generate the Xn signal.

Figure 3:
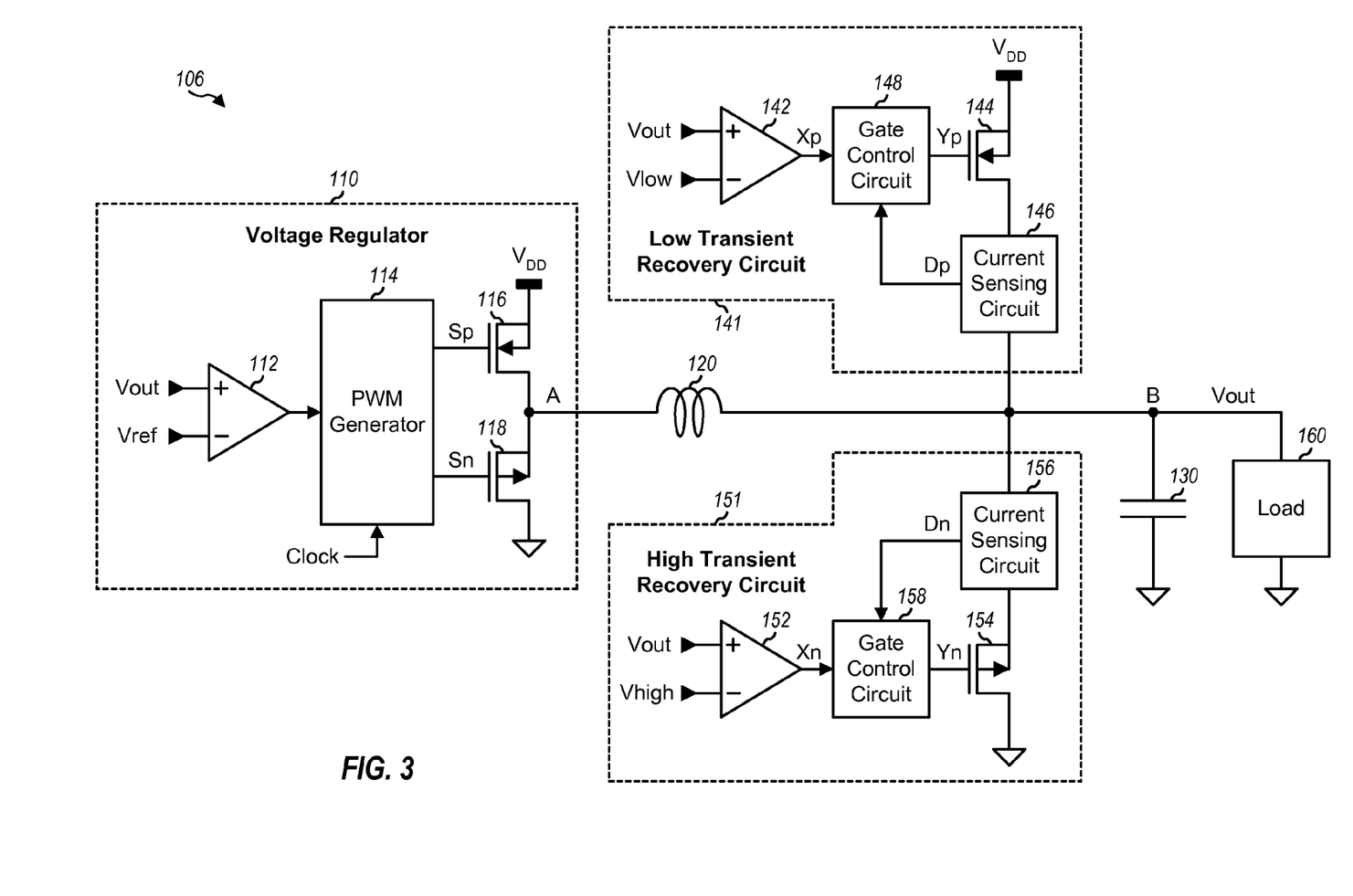
FIG. 3 shows the voltage regulator with low and high transient recovery circuits.

FIG. 3 shows a schematic diagram of a power controller 106 comprising voltage regulator 110, a low transient recovery circuit 141, and a high transient recovery circuit 151. Circuit 141 combats low transients in the Vout voltage, and circuit 151 combats high transients in the Vout voltage.

Within circuit 141, comparator 142 receives the Vout voltage at the non-inverting input and the Vlow voltage at the inverting input and generates the Xp control signal based on the comparison result. A current sensing circuit 146 detects the amount of current provided by MOSFET 144 and outputs a Dp signal indicative of the amount of detected current. A gate control circuit 148 receives the Xp signal and the Dp signal and generates a Yp gate control signal. MOSFET 144 has its source coupled to the $V_{DD}$ supply voltage, its gate receiving the Yp signal, and its drain coupled to node B via current sensing circuit 146.

Within circuit 151, comparator 152 receives the Vout voltage at the non-inverting input and the Vhigh voltage at the inverting input and generates the Xn control signal based on the comparison result. A current sensing circuit 156 detects the amount of current provided by MOSFET 154 and outputs a Dn signal indicative of the amount of detected current. A gate control circuit 158 receives the Xn signal and the Dn signal and generates a Yn gate control signal. MOSFET 154 has its drain coupled to node B via current sensing circuit 156, its gate receiving the Yn signal, and its source coupled to circuit ground.

For low transient recovery circuit 141, comparator 142 detects for low transients in the Vout voltage and generates the Xp signal to turn on MOSFET 144 when low transients are detected. Current sensing circuit 146 senses the amount of current provided by MOSFET 144 when turned on. Control circuit 148 generates the Yp signal such that (i) MOSFET 144 is turned on when directed by the Xp signal and (ii) the amount of current provided by MOSFET 144 is limited to within a predetermined value. Limiting the amount of current via MOSFET 144 may avoid over-correction of low transients and may also improve the reliability of MOSFET 144. Control circuit 148 may also generate the Yp signal with a soft start so that MOSFET 144 is turned on gradually, instead of abruptly, when a low transient is detected.

For high transient recovery circuit 151, comparator 152 detects for high transients in the Vout voltage and generates the Xn signal to turn on MOSFET 154 when high transients are detected. Current sensing circuit 156 senses the amount of current drawn by MOSFET 154 when turned on. Control circuit 158 generates the Yn signal such that (i) MOSFET 154 is turned on when directed by the Xn signal and (ii) the amount of current drawn by MOSFET 154 is limited to within a predetermined value. Limiting the amount of current via MOSFET 154 may avoid over-correction of high transients and may also improve the reliability of MOSFET 154. Control circuit 158 may also generate the Yn signal with a soft start so that MOSFET 154 is turned on gradually, instead of abruptly, when a high transient is detected.

Figure 4:
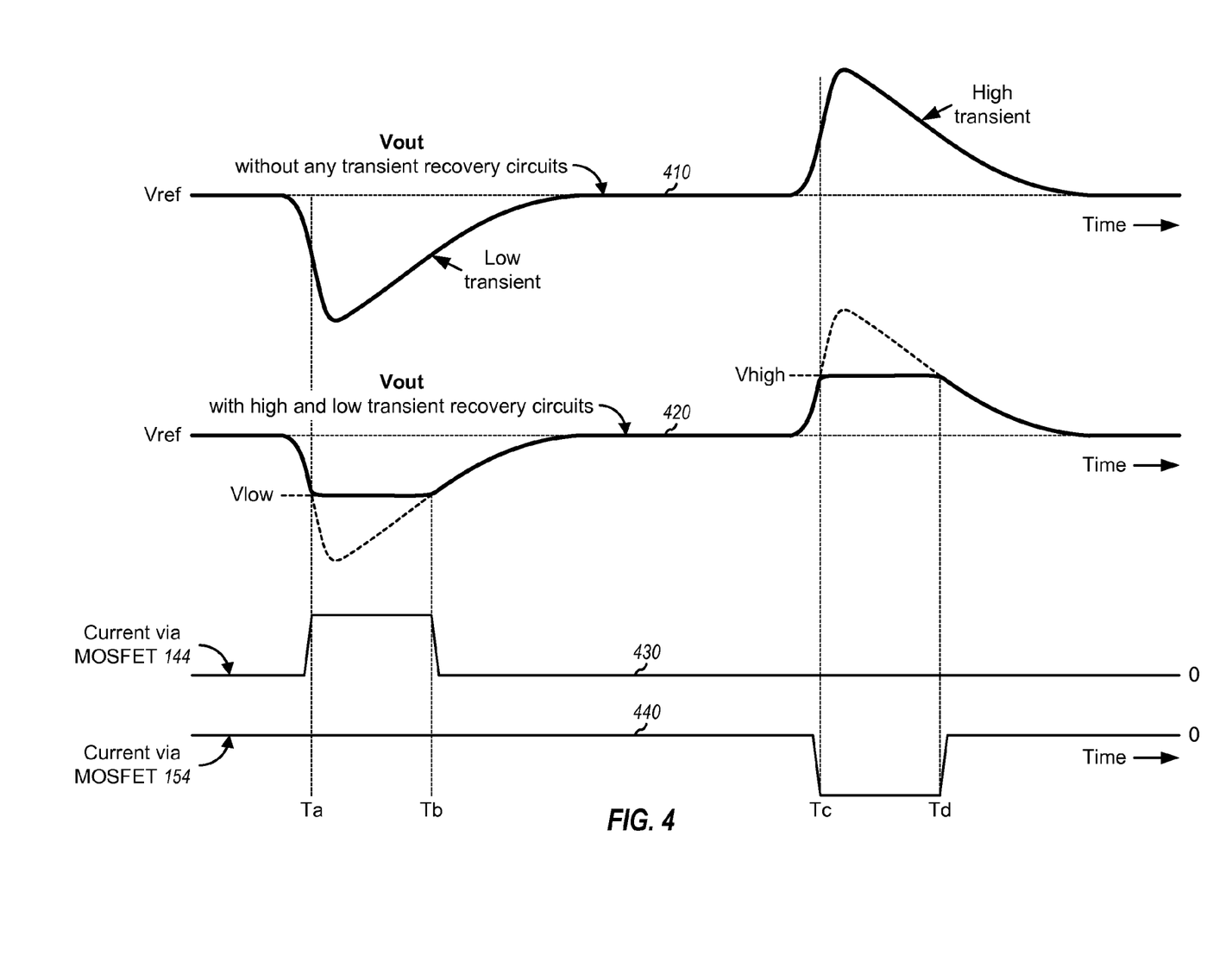
FIG. 4 shows operation of the low and high transient recovery circuits in FIG. 3.

FIG. 4 shows operation of the low and high transient recovery circuits in FIG. 3. A plot 410 shows the Vout voltage without any transient recovery circuits. For plot 410, the Vout voltage has a low transient starting near time Ta and a high transient starting near time Tc. The amount of drop in the Vout voltage during the low transient may be dependent on the sizes of inductor 120 and capacitor 130 and the amount of increase in load 160. Similarly, the amount of increase in the Vout voltage during the high transient may be dependent on the inductor and capacitor sizes and the amount of decrease in load 160.

A plot 420 shows the Vout voltage with the low and high transient recovery circuit. For plot 420, the Vout voltage has a low transient starting near time Ta. However, when Vout falls below Vlow, MOSFET 144 is turned on, and the $V_{DD}$ supply voltage brings up Vout. A plot 430 shows the current provided by MOSFET 144, which is high during the low transient and zero otherwise. Vout may be maintained near Vlow (as shown in FIG. 4) or brought higher than Vlow (not shown in FIG. 4) depending on whether or not hysteresis is applied and/or other factors.

For plot 420, the Vout voltage has a high transient starting near time Tc. However, when Vout exceeds Vhigh, MOSFET 154 is turned on, and Vout is pulled toward circuit ground. A plot 440 shows the current provided by MOSFET 154, which is negative during the high transient and zero otherwise. Vout may be maintained near Vhigh (as shown in FIG. 4) or brought lower than Vhigh (not shown in FIG. 4) depending on whether or not hysteresis is applied and/or other factors.

In general, a transient recovery circuit may combat only high transients, or only low transients, or both high and low transients. A transient recovery circuit may comprise a low transient recovery circuit (e.g., as shown in FIG. 2A or 3) and/or a high transient recovery circuit (e.g., as shown in FIG. 2B or 3).

FIGS. 1 through 3 show several designs of a power controller with a single output voltage. A power controller may also be designed to support multiple output voltages for multiple loads.

Figure 5:
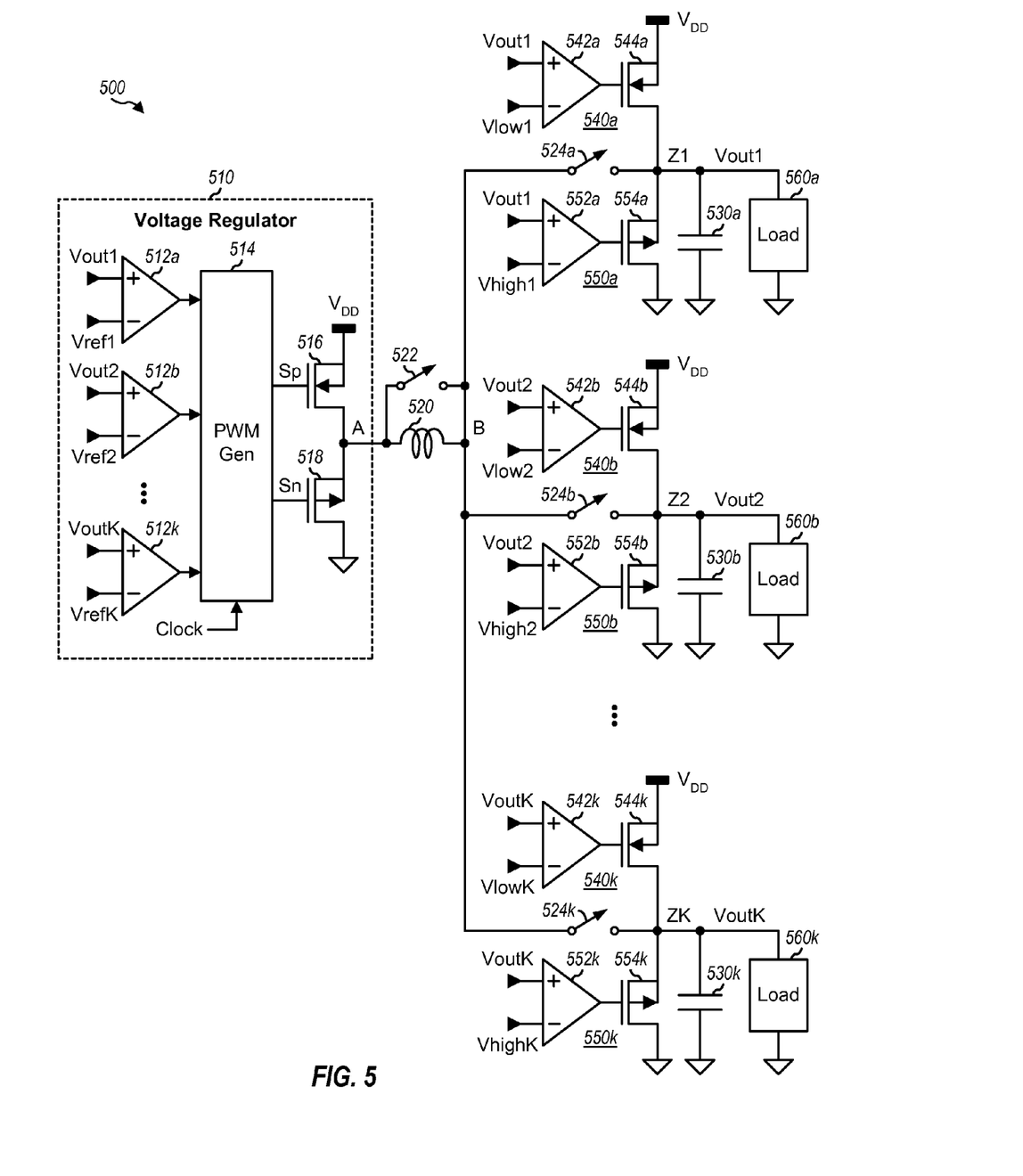
FIG. 5 shows a single-inductor multiple-output (SIMO) voltage regulator with transient recovery circuits for multiple output voltages.

FIG. 5 shows a power controller 500 comprising a single-inductor multiple-output (SIMO) voltage regulator 510 and multiple transient recovery circuits for multiple loads. SIMO voltage regulator 510 receives a $V_{DD}$ supply voltage and generates a regulator output signal used to generate K output voltages, Vout1 through VoutK, for K loads 560a through 560k, where K may be any integer value.

Within SIMO voltage regulator 510, K error amplifiers 512a through 512k generate amplified error signals for the K output voltages. Error amplifier 512a receives the Vout1 voltage at its non-inverting input and a Vref1 reference voltage for load 560a at its inverting input. Amplifier 512a compares the two voltages to obtain an error, amplifies the error, and provides an amplified error signal for load 560a. Each of the remaining error amplifiers 512b through 512k similarly receives an output voltage and a reference voltage for a respective load and generates an amplified error signal for its load. Vref1 through VrefK are the target voltages for Vout1 through VoutK, respectively, and may be fixed or configurable values.

A PWM generator 514 receives the K amplified error signals from amplifiers 512a through 512k and a clock signal and generates Sp and Sn control signals, which have duty cycles determined based on the amplified error signals, as described below. A P-channel MOSFET 516 has its source coupled to the $V_{DD}$ supply voltage, its gate receiving the Sp signal, and its drain coupled to node A. An N-channel MOSFET 518 has its drain coupled to node A, its gate receiving the Sn signal, and its source coupled to circuit ground. MOSFET 516 is turned on when the Sp signal is at logic low, and MOSFET 518 is turned on when the Sn signal is at logic high. MOSFETs 516 and 518 provide the regulator output signal at node A.

Power controller 500 further includes an inductor 520, capacitors 530a through 530k, and switches 522 and 524a through 524k. Inductor 520 and switch 522 are coupled in parallel and have one end coupled to node A and the other end coupled to node B. Switches 524a through 524k have one end coupled to node B and the other end coupled to nodes Z1 through ZK, respectively. Capacitors 530a through 530k have one end coupled to nodes Z1 through ZK, respectively, and the other end coupled to circuit ground. Inductor 520 and capacitors 530a through 530k filter the regulator output signal at node A to generate the Vout1 through VoutK voltages at nodes Z1 through ZK, respectively. Inductor 520 and capacitors 530a through 530k may be of suitable values to provide the desired amount of filtering for the output voltages.

K low transient recovery circuits 540a through 540k couple to nodes Z1 through ZK, respectively, and combat low transients in the Vout1 through VoutK voltages, respectively. Each low transient recovery circuit 540 includes a comparator 542 and a P-channel MOSFET 544, which are coupled in the same manner as comparator 142 and P-channel MOSFET 144 in FIG. 2A. K high transient recovery circuits 550a through 550k also couple to nodes Z1 through ZK, respectively, and combat high transients in the Vout1 through VoutK voltages, respectively. Each high transient recovery circuit 550 includes a comparator 552 and an N-channel MOSFET 554, which are coupled in the same manner as comparator 152 and N-channel MOSFET 154 in FIG. 2B.

Voltage regulator 510, low transient recovery circuits 540a through 540k, and high transient recovery circuits 550a through 550k may be fabricated on an IC. Inductor 520 and capacitors 530a through 530k may be external to the IC. Inductor 520 and capacitors 530a through 530k may also be considered as part of voltage regulator 510. Switches 522 and 524a through 524k may be fabricated on the IC or external to the IC.

Power controller 500 uses only one pair of MOSFETs 516 and 518 and one inductor 520 to generate multiple (K) output voltages for multiple loads 560. Power controller 500 may thus reduce cost and area over a design that uses multiple separate voltage regulators to generate multiple output voltages. However, SIMO voltage regulator 510 may have poor dynamic response. Low and high transient recovery circuits 540 and 550 may improve the dynamic response.

SIMO voltage regulator 510 uses time division multiplexing (TDM) to alternately switch the current from inductor 520 into K capacitors 530a through 530k. In one design, in each time interval of K consecutive clock cycles, the current from inductor 520 may be provided to capacitor 530a in the first clock cycle, to capacitor 530b in the second clock cycle, and so on, and to capacitor 530k in the K-th clock cycle. SIMO voltage regulator 510 may thus cycle through the K capacitors 530a through 530k and service one capacitor in each clock cycle. This multiplexing allows multiple output voltages to be generated using a single inductor 520.

Power controller 500 may achieve improved dynamic performance by using transient recovery circuits 540 and 550 to regulate each output voltage. For each load 560, circuits 540 and 550 detect whether the output voltage for that load has departed from the target voltage by a certain amount, going above a high threshold voltage or below a low threshold voltage. If the output voltage is too low, then circuit 540 is turned on to bring the output voltage back up toward the target voltage. If the output voltage is too high, then circuit 550 is turned on to bring the output voltage back down toward the target voltage. MOSFETs 544 and 554 in circuits 540 and 550 remain off when the output voltage is between the low and high threshold voltages. Thus, the power loss in MOSFETs 544 and 554 may be negligible since they may be turned on for only brief periods of time.

Figure 6:
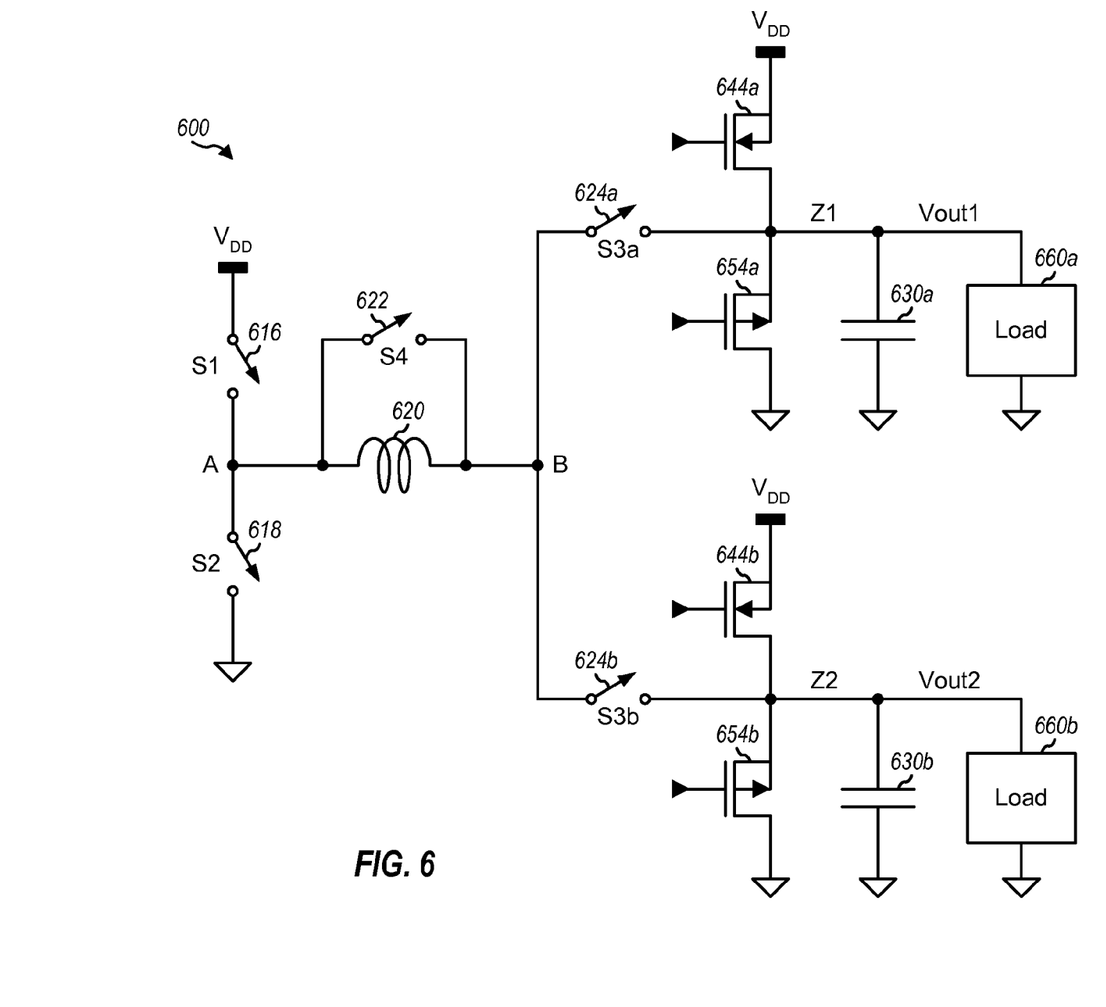
FIG. 6 shows a model of the SIMO voltage regulator with two output voltages.

FIG. 6 shows a model 600 of power controller 500 with K=2 output voltages for two loads. In model 600, switches 616 and 618 model MOSFETs 516 and 518, respectively. Switch 616 is coupled between $V_{DD}$ and node A, and switch 618 is coupled between node A and circuit ground. Switches 616 and 618 are also denoted as S1 and S2, respectively. An inductor 620 and a switch 622 are coupled in parallel and between nodes A and B. Switch 622 is also denoted as S4.

For the first load 660a, a switch 624a is coupled between nodes B and Z1 and is also denoted as S3a. A capacitor 630a and load 660a are coupled in parallel and between node Z1 and circuit ground. A MOSFET 644a is coupled between $V_{DD}$ and node Z1, and a MOSFET 654a is coupled between node Z1 and circuit ground. For the second load 660b, a switch 624b is coupled between nodes B and Z2 and is also denoted as S3b. A capacitor 630b and load 660b are coupled in parallel and between node Z2 and circuit ground. A MOSFET 644b is coupled between $V_{DD}$ and node Z2, and a MOSFET 654b is coupled between node Z2 and circuit ground.

Figure 7:
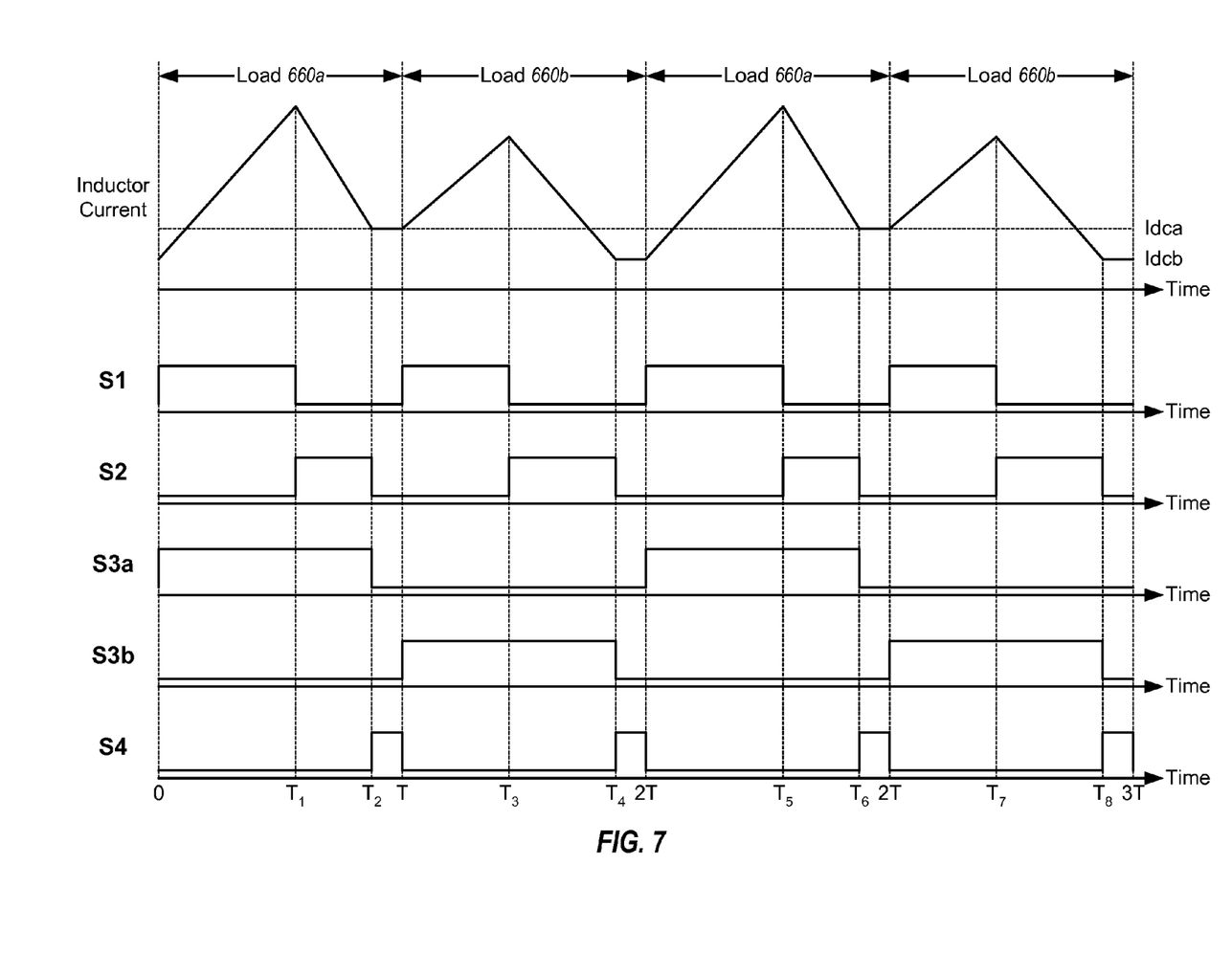
FIG. 7 shows a timing diagram for the model in FIG. 6.

FIG. 7 shows a timing diagram for model 600 in FIG. 6 with K=2 output voltages. For simplicity, switches S1, S2, S3a, S3b and S4 operate with positive logic, so that each switch is closed by logic high and is opened by logic low on its control signal.

As shown in FIG. 7, load 660a is served in the first clock cycle from time 0 to time T, then load 660b is served in the second clock cycle from time T to time 2T, then load 660a is again served in the third clock cycle from time 2T to time 3T, and so on, where T is one clock period. The process thus repeats every two clock cycles.

In the first clock cycle, from time 0 to time $T_1$, switches S1 and S3a are closed, all other switches are opened, $V_{DD}$ supplies current to load 660a, and the current in inductor 620 increases. From time $T_1$ to time $T_2$, switches S2 and S3a are closed, all other switches are opened, inductor 620 provides its stored energy to capacitor 630a and load 660a, and the current in inductor 620 decreases. From time $T_2$ to time T, switch S4 is closed, all other switches are opened, and the current in inductor 620 is maintained at the same level.

In the second clock cycle, from time T to time $T_3$, switches S1 and S3b are closed, all other switches are opened, $V_{DD}$ supplies current to load 660b, and the current in inductor 620 increases. From time $T_3$ to time $T_4$, switches S2 and S3b are closed, all other switches are opened, inductor 620 provides its stored energy to capacitor 630b and load 660b, and the current in inductor 620 decreases. From time $T_4$ to time 2T, switch S4 is closed, all other switches are opened, and the current in inductor 620 is maintained at the same level.

A switching regulator such as voltage regulator 110 in FIGS. 1 through 3 or voltage regulator 510 in FIG. 5 may operate in a discontinuous conduction mode (DCM), a continuous conduction mode (CCM), or a pseudo-continuous conduction mode (PCCM). In DCM, the inductor current reaches zero and stays constant at zero at the end of each clock cycle. In CCM, the inductor current always stays above zero and is not required to fall to any particular DC level. In PCCM, the inductor current reaches and stays constant at a non-zero DC level at the end of each clock cycle. For all modes, the average of the inductor current is equal to the load current. DCM can thus support small loads whereas CCM and PCCM can support heavy loads.

For SIMO voltage regulator 510 in FIG. 5, a single inductor 520 is coupled to K different loads 560a through 560k in different clock cycles. Operating SIMO voltage regulator 510 in PCCM may avoid cross regulation, which occurs when a change at one load causes a change in an output voltage of another load. PCCM results in the inductor current starting and ending at known DC levels for each load in each clock cycle. For each load, the inductor current starts at a known DC level at the beginning of each clock cycle for that load and ends at a known DC level at the end of the clock cycle. For unbalanced loads, each load can have a different DC level, as shown in FIG. 7. In any case, the inductor current drops to a known DC level at the end of each clock cycle before being switched to another load. PCCM can avoid cross-regulation since no loads are connected to the inductor during the constant-current stage and each load is isolated.

In FIG. 5, switches 524a through 524k direct the current in inductor 520 into appropriate loads 560a through 560k, respectively. When switch 524a is closed, error amplifier 512a in the feedback loop determines the duty cycle at which MOSFETs 516 and 518 are turned on in order to maintain the Vout1 voltage at or near the Vref1 voltage. When MOSFET 518 is turned on, the current in inductor 520 falls to a certain level. MOSFET 518 is then turned off, switch 522 is closed, and switch 524a is opened. Closing switch 522 keeps the voltage $V_L$ across inductor 520 at zero and maintains the inductor current constant since $$V_L = L \cdot \frac{di_L}{dt}.$$

Analogous operation occurs when switch 524b is closed, except now the inductor current flows into Vout2.

Transient recovery circuits 540 and 550 for each load 560 help reduce transient effects during sudden changes in the load. For example, when the Vout voltage rises above a Vhigh1 threshold voltage, MOSFET 554a within transient recovery circuit 550a turns on and provides an alternate path for some of the inductor current. Not as much current then flows into load 560a, and the Vout1 voltage falls back to its steady-state level more quickly. In one design not shown in FIG. 5, MOSFET 554a does not turn off until the Vout1 voltage drops below a Vhigh1_hys hysteretic voltage that is lower than the Vhigh1 threshold voltage used to turn on MOSFET 554a. This design provides hysteresis and prevents the Vout1 voltage from oscillating back and forth across the Vhigh1 threshold voltage. Analogous behavior occurs when the Vout1 voltage drops below a Vlow1 threshold voltage. MOSFET 544a within transient recovery circuit 540a turns on and sources additional current into load 560a. Transient recovery circuits 540b through 540k and 550b through 550k for other loads 560b through 560k operate in similar manner.

Transient recovery circuits 540 and 550 may greatly dampen voltage spikes caused by sudden load changes and may allow the output voltages to settle to their steady-state levels more quickly. MOSFETs 544 within circuits 540 and MOSFETs 554 within circuits 550 may be turned on and off regardless of the states of switches 524a through 524k, i.e., regardless of whether or not inductor 520 is coupled to a particular load at any given moment. Furthermore, since MOSFETs 544 and 554 are typically turned on for only brief periods of time during transients, these MOSFETs may not dissipate much power and may have negligible effects on the efficiency of power controller 500.

Figure 8:
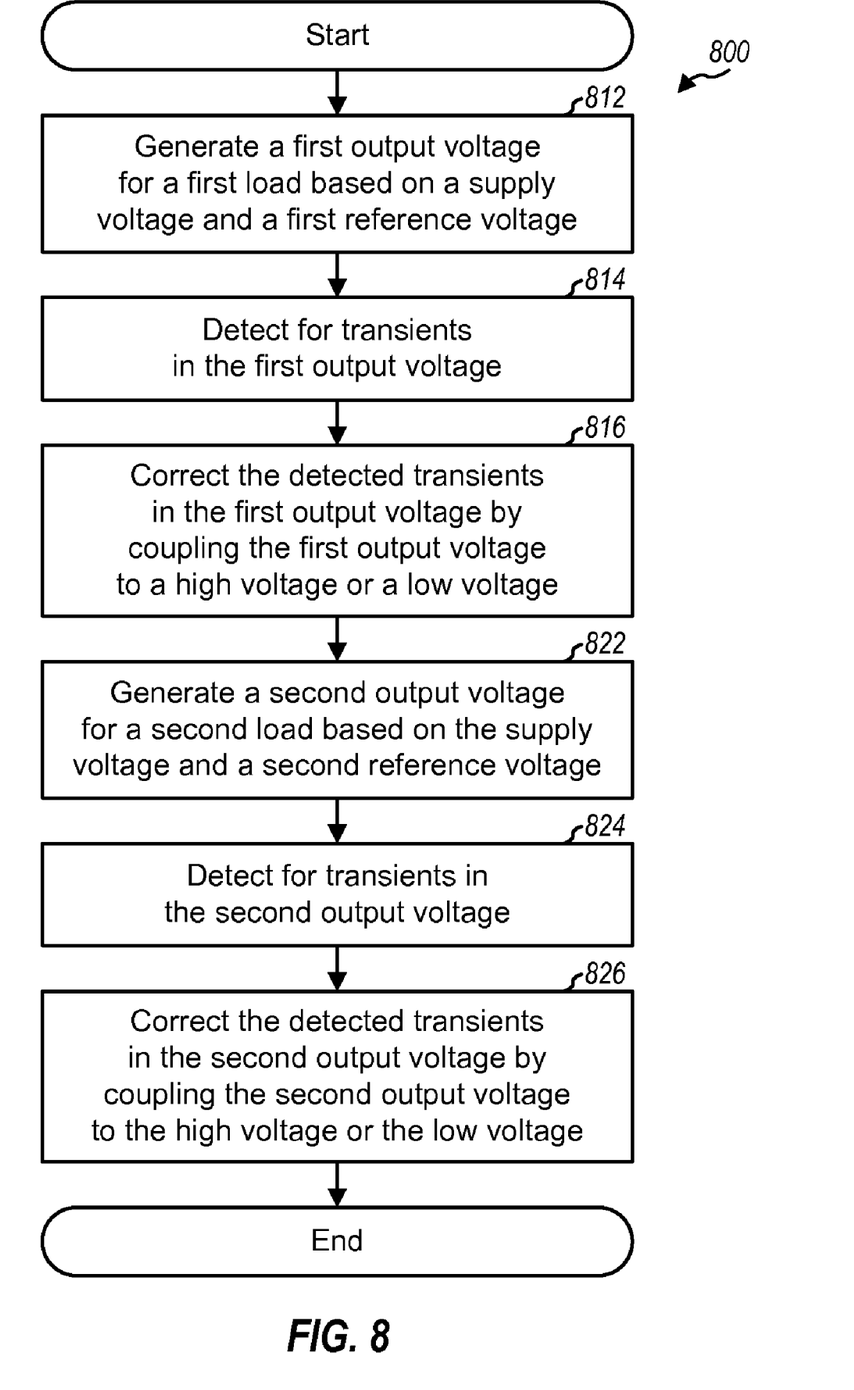
FIG. 8 shows a process for generating output voltages with transient recovery.

FIG. 8 shows a design of a process 800 for generating one or more output voltages for one or more loads. A first output voltage for a first load may be generated based on a supply voltage and a first reference voltage (block 812). Transients in the first output voltage may be detected (block 814). The detected transients in the first output voltage may be corrected by coupling the first output voltage to a high voltage (e.g., $V_{DD}$) or a low voltage (e.g., circuit ground), as appropriate (block 816). A second output voltage for a second load may be generated based on the supply voltage and a second reference voltage (block 822). Transients in the second output voltage may be detected (block 824). The detected transients in the second output voltage may be corrected by coupling the second output voltage to the high voltage or the low voltage, as appropriate (block 826). The transient detection and correction may occur independently of the output voltage generation. For example, an output voltage for one load may be generated while transients may be detected and corrected for another load.

In one design of block 812, a regulator output signal may be generated based on the first reference voltage and the first output signal during a first clock cycle and filtered to generate the first output voltage for the first load. In one design of block 822, the regulator output signal may be generated based on the second reference voltage and the second output signal during a second clock cycle and filtered to generate the second output voltage for the second load.

For blocks 814, 816, 824 and 826, a low transient in a given output voltage may be detected by (i) comparing the output voltage against a low threshold voltage and (ii) detecting a low transient when the output voltage is below the low threshold voltage. The output voltage may be coupled to the high voltage to correct the low transient, e.g., until the output voltage is above a low hysteretic voltage that is higher than the low threshold voltage.

For blocks 814, 816, 824 and 826, a high transient in a given output voltage may be detected by (i) comparing the output voltage against a high threshold voltage and (ii) detecting a high transient when the output voltage is above the high threshold voltage. The output voltage may be coupled to the low voltage to correct the high transient, e.g., until the output voltage is below a high hysteretic voltage that is lower than the high threshold voltage.

The voltage regulator with transient recovery circuits described herein may be used for various electronics devices such as wireless communication devices, handheld devices, gaming devices, computing devices, computers, laptop computers, consumer electronics devices, etc. The use of the voltage regulator with transient recovery circuits in a wireless communication device is described below.

Figure 9:
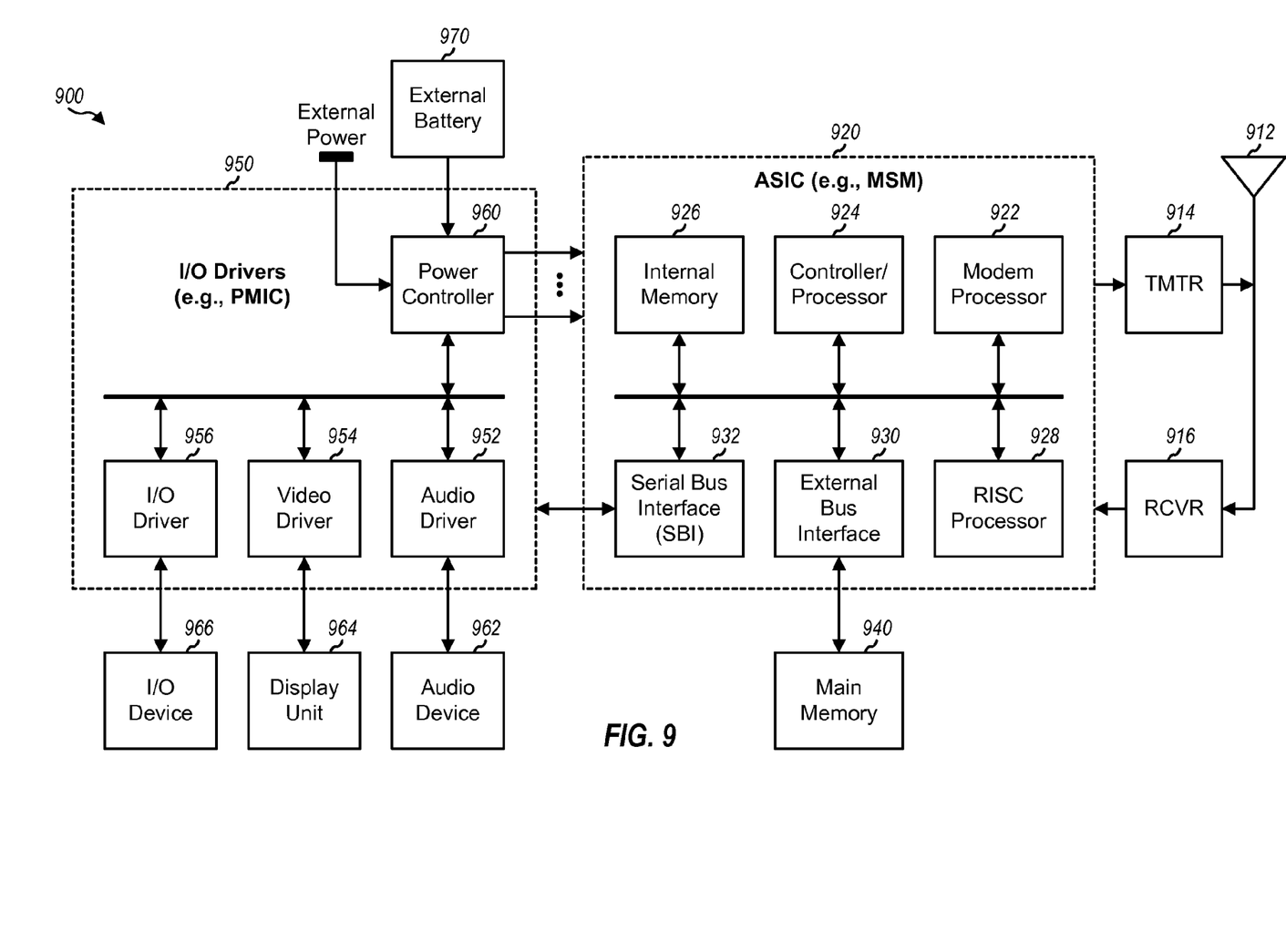
FIG. 9 shows a block diagram of a wireless communication device.

FIG. 9 shows a block diagram of a design of a wireless communication device 900. Wireless device 900 may be a cellular phone, a terminal, a handset, a personal digital assistant (PDA), etc. Wireless device 900 may be capable of communicating with one or more wireless communication systems such as a Code Division Multiple Access (CDMA) system, a Global System for Mobile Communications (GSM) system, a wireless local area network (WLAN), etc.

Wireless device 900 is capable of providing bi-directional communication via a transmit path and a receive path. On the transmit path, a transmitter (TMTR) 914 receives data from an application specific integrated circuit (ASIC) 920, processes and conditions the data, and generates a modulated signal, which is transmitted via an antenna 912 to base stations. On the receive path, signals transmitted by the base stations are received by antenna 912 and provided to a receiver (RCVR) 916. Receiver 916 conditions and digitizes the received signal and provides samples to ASIC 920 for further processing.

ASIC 920 may include various processing, interface and memory units such as, e.g., a modem processor 922, a controller/processor 924, an internal memory 926, a reduced instruction set computing (RISC) processor 928, an external bus interface (EBI) 930, and a serial bus interface (SBI) 932. Modem processor 922 may perform processing for data transmission and reception, e.g., encoding, modulation, demodulation, decoding, etc. RISC processor 928 may perform various types of processing for wireless device 900, e.g., processing for video, graphics, higher layer applications, etc. Controller/processor 924 may direct the operation of various units within ASIC 920. Internal memory 926 may store data and/or instructions for various units within ASIC 920. External bus interface 930 may facilitate transfer of data between ASIC 920 and a main memory 940, which may provide bulk storage for data and program codes used by ASIC 920. Serial bus interface 932 may facilitate communication between ASIC 920 and an ASIC 950.

ASIC 950 may include various circuit blocks such as, e.g., an audio driver 952, a video driver 954, an input/output (I/O) driver 956, and a power controller 960. Audio driver 952 may drive an audio device 962. Video driver 954 may drive a display unit 964. I/O driver 956 may drive an I/O device 966. Power controller 960 may couple to an external battery 970 and/or receive external power via a power connector. Power controller 960 may generate output voltages for the processing units within ASIC 920. Power controller 960 may implement any of the designs shown in FIGS. 2A, 2B, 3 and 5. ASIC 920 may be partitioned into multiple power domains in order to facilitate powering down in idle mode. Each power domain may include circuit blocks coupled to a respective output voltage and may correspond to one load 560 in FIG. 5.

ASIC 920 may be a Mobile Station Modem (MSM) from Qualcomm Incorporated. ASIC 950 may be a Power Management IC (PMIC) from Qualcomm Incorporated. ASICs 920 and 950 may also be other ICs from other manufacturers. ASICs 920 and 950 may each comprise a single IC die or multiple IC dies.

The voltage regulator with transient recovery circuits described herein may be implemented on an IC, an analog IC, a radio frequency IC (RFIC), a mixed-signal IC, an ASIC, a printed circuit board (PCB), an electronics device, etc. The voltage regulator with transient recovery circuits may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), etc.

An apparatus implementing the voltage regulator with transient recovery circuits described herein may be a standalone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as an MSM, (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
a voltage regulator configured to receive a supply voltage and generate a regulator output signal used to generate an output voltage for a load; and
a transient recovery circuit configured to detect for transients in the output voltage and to correct the detected transients, the transient recovery circuit comprising:
a comparator configured to receive a threshold voltage and the output voltage and generate a control signal;
a transistor coupled between either a high voltage or a low voltage and the output voltage and enabled based on the control signal;
a current sensing circuit coupled to the transistor and configured to sense a current provided by the transistor, and
a control circuit coupled to the comparator, the current sensing circuit, and the transistor and configured to generate a gate control signal for the transistor to limit the current provided by the transistor.

2. The apparatus of claim 1, wherein the transient recovery circuit is configured to detect for a low transient in the output voltage and to correct the low transient by coupling the output voltage to a high voltage.

3. The apparatus of claim 2, wherein the transient recovery circuit is configured to compare the output voltage against a low threshold voltage and to detect the low transient when the output voltage is below the low threshold voltage.

4. The apparatus of claim 3, wherein the transient recovery circuit is configured to couple the output voltage to the high voltage, when the low transient is detected, until the output voltage is above a hysteretic voltage that is higher than the low threshold voltage.

5. The apparatus of claim 1, wherein the transient recovery circuit is configured to detect for a high transient in the output voltage and to correct the high transient by coupling the output voltage to a low voltage.

6. The apparatus of claim 5, wherein the transient recovery circuit is configured to compare the output voltage against a high threshold voltage and to detect the high transient when the output voltage is above the high threshold voltage.

7. The apparatus of claim 6, wherein the transient recovery circuit is configured to couple the output voltage to the low voltage, when the high transient is detected, until the output voltage is below a hysteretic voltage that is lower than the high threshold voltage.

8. The apparatus of claim 1, wherein the voltage regulator comprises
an amplifier configured to receive the output voltage and a reference voltage and generate an error signal,
a pulse width modulator (PWM) generator configured to receive the error signal and generate first and second control signals,
a first transistor coupled between the supply voltage and an output node and enabled based on the first control signal, and
a second transistor coupled between the output node and circuit ground and enabled based on the second control signal.

9. The apparatus of claim 1, further comprising:
an inductor coupled between the voltage regulator and the load; and
a capacitor coupled to the inductor and circuit ground.

10. An integrated circuit comprising:
a voltage regulator configured to receive a supply voltage and generate a regulator output signal used to generate an output voltage for a load; and
a transient recovery circuit configured to detect for transients in the output voltage and to correct the detected transients, the transient recovery circuit comprising:
a comparator configured to receive a threshold voltage and the output voltage and generate a control signal;
a transistor coupled between either a high voltage or a low voltage and the output voltage and enabled based on the control signal;
a current sensing circuit coupled to the transistor and configured to sense a current provided by the transistor, and
a control circuit coupled to the comparator, the current sensing circuit, and the transistor and configured to generate a gate control signal for the transistor to limit the current provided by the transistor.

11. An apparatus comprising:
a voltage regulator configured to receive a supply voltage and generate a regulator output signal used to generate multiple output voltages for multiple loads; and
multiple transient recovery circuits for the multiple output voltages, each transient recovery circuit configured to detect for transients in a respective output voltage and to correct the detected transients, wherein each of the transient recovery circuits comprises:
a comparator configured to receive a threshold voltage and the output voltage and generate a control signal;
a transistor coupled between either a high voltage or a low voltage and the output voltage and enabled based on the control signal;
a current sensing circuit coupled to the transistor and configured to sense a current provided by the transistor, and
a control circuit coupled to the comparator, the current sensing circuit, and the transistor and configured to generate a gate control signal for the transistor to limit the current provided by the transistor.

12. The apparatus of claim 11, further comprising:
an inductor coupled between the voltage regulator and a common node;
a first switch coupled across the inductor; and
multiple switches coupled between the common node and the multiple loads.

13. The apparatus of claim 12, wherein the multiple switches are configured to couple the inductor to the multiple loads in multiple clock periods, to one load in each clock period.

14. The apparatus of claim 12, wherein the voltage regulator is configured to generate the regulator output signal based further on a clock signal, and wherein the first switch is shorted for a portion of each clock cycle.

15. The apparatus of claim 11, wherein the multiple transient recovery circuits operate independently of the voltage regulator.

16. A method comprising:
generating an output voltage for a load based on a supply voltage and a reference voltage;
detecting for transients in the output voltage; and
correcting the detected transients in the output voltage by coupling the output voltage to a high voltage or a low voltage, comprising:
comparing the output voltage to a threshold voltage;
generating a first control signal based on the comparison of the output voltage and the threshold voltage;
detecting the current provided by a recovery transistor;
generating a second control signal based on the sensed current;

generating a third control signal based upon the first and second control signals; and switching the transistor on and off to limit the current provided by the transistor based upon the third control signal.

17. The method of claim 16, wherein the detecting for transients comprises comparing the output voltage against a low threshold voltage, and detecting a low transient when the output voltage is below the low threshold voltage, and wherein the correcting the detected transients comprises coupling the output voltage to the high voltage to correct the low transient.

18. The method of claim 17, wherein the correcting the detected transients comprises coupling the output voltage to the high voltage, when the low transient is detected, until the output voltage is above a hysteretic voltage that is higher than the low threshold voltage.

19. The method of claim 16, wherein the detecting for transients comprises comparing the output voltage against a high threshold voltage, and detecting a high transient when the output voltage is above the high threshold voltage, and wherein the correcting the detected transients comprises coupling the output voltage to the low voltage to correct the high transient.

20. The method of claim 19, wherein the correcting the detected transients comprises coupling the output voltage to the low voltage, when the high transient is detected, until the output voltage is below a hysteretic voltage that is lower than the high threshold voltage.

21. The method of claim 16, further comprising:
generating a second output voltage for a second load based on the supply voltage and a second reference voltage;
detecting for transients in the second output voltage; and
correcting the detected transients in the second output voltage by coupling the second output voltage to the high voltage or the low voltage.

22. The method of claim 21, wherein the generating the output voltage comprises generating a regulator output signal based on the reference voltage and the output signal during a first clock cycle, and filtering the regulator output signal during the first clock cycle to generate the output voltage for the load, and wherein the generating the second output voltage comprises generating the regulator output signal based on the second reference voltage and the second output signal during a second clock cycle, and filtering the regulator output signal during the second clock cycle to generate the second output voltage for the second load.

23. An apparatus comprising:
means for generating an output voltage for a load based on a supply voltage and a reference voltage;
means for detecting for transients in the output voltage; and
means for correcting the detected transients in the output voltage by coupling the output voltage to a high voltage or a low voltage, said means for correcting the detected transients comprising:
means for comparing the output voltage to a threshold voltage;
means for generating a first control signal based on the comparison of the output voltage and the threshold voltage;
means for detecting the current provided by a recovery transistor;
means for generating a second control signal based on the sensed current;
means for generating a third control signal based upon the first and second control signals; and
means for switching the transistor on and off to limit the current provided by the transistor based upon the third control signal.

24. The apparatus of claim 23, wherein the means for detecting for transients comprises means for comparing the output voltage against a low threshold voltage, and means for detecting a low transient when the output voltage is below the low threshold voltage, and wherein the means for correcting the detected transients comprises means for coupling the output voltage to the high voltage to correct the low transient.

25. The apparatus of claim 23, wherein the means for detecting for transients comprises means for comparing the output voltage against a high threshold voltage, and means for detecting a high transient when the output voltage is above the high threshold voltage, and wherein the means for correcting the detected transients comprises means for coupling the output voltage to the low voltage to correct the high transient.

26. The apparatus of claim 23, further comprising:
means for generating a second output voltage for a second load based on the supply voltage and a second reference voltage;
means for detecting for transients in the second output voltage; and
means for correcting the detected transients in the second output voltage by coupling the second output voltage to the high voltage or the low voltage.

27. The apparatus of claim 26, wherein the means for generating the output voltage comprises means for generating a regulator output signal based on the reference voltage and the output signal during a first clock cycle, and means for filtering the regulator output signal during the first clock cycle to generate the output voltage for the load, and wherein the means for generating the second output voltage comprises means for generating the regulator output signal based on the second reference voltage and the second output signal during a second clock cycle, and means for filtering the regulator output signal during the second clock cycle to generate the second output voltage for the second load.

28. A non-transitory tangible computer-readable storage medium having stored thereon processor-executable software instructions configured to cause a processor to perform operations comprising:
generating an output voltage for a load based on a supply voltage and a reference voltage;
detecting for transients in the output voltage; and
correcting the detected transients in the output voltage by coupling the output voltage to a high voltage or a low voltage, comprising:
comparing the output voltage to a threshold voltage;
generating a first control signal based on the comparison of the output voltage and the threshold voltage;
detecting the current provided by a recovery transistor;
generating a second control signal based on the sensed current;
generating a third control signal based upon the first and second control signals; and
switching the transistor on and off to limit the current provided by the transistor based upon the third control signal.

29. The computer-readable medium of claim 28, wherein the stored processor-executable software instructions are configured to cause a processor to perform further operations comprising:
comparing the output voltage against a low threshold voltage;
detecting a low transient when the output voltage is below the low threshold voltage; and coupling the output voltage to the high voltage to correct the low transient.

30. The computer-readable medium of claim 29, wherein the stored processor-executable software instructions are configured to cause a processor to perform further operations comprising:
coupling the output voltage to the high voltage, when the low transient is detected, until the output voltage is above a hysteretic voltage that is higher than the low threshold voltage.

31. The computer-readable medium of claim 28, wherein the stored processor-executable software instructions are configured to cause a processor to perform further operations comprising:
comparing the output voltage against a high threshold voltage;
detecting a high transient when the output voltage is above the high threshold voltage; and
coupling the output voltage to the low voltage to correct the high transient.

32. The computer-readable medium of claim 31, wherein the stored processor-executable software instructions are configured to cause a processor to perform further operations comprising:
coupling the output voltage to the low voltage, when the high transient is detected, until the output voltage is below a hysteretic voltage that is lower than the high threshold voltage.

33. The computer-readable medium of claim 28, wherein the stored processor-executable software instructions are configured to cause a processor to perform further operations comprising:
generating a second output voltage for a second load based on the supply voltage and a second reference voltage;
detecting for transients in the second output voltage; and
correcting the detected transients in the second output voltage by coupling the second output voltage to the high voltage or the low voltage.

34. The computer-readable medium of claim 33, wherein the stored processor-executable software instructions are configured to cause a processor to perform further operations comprising:
generating a regulator output signal based on the reference voltage and the output signal during a first clock cycle;
filtering the regulator output signal during the first clock cycle to generate the output voltage for the load;
generating the regulator output signal based on the second reference voltage and the second output signal during a second clock cycle; and
filtering the regulator output signal during the second clock cycle to generate the second output voltage for the second load.

* * * * *